United States Patent
Seering et al.

(10) Patent No.: US 12,050,755 B2
(45) Date of Patent: Jul. 30, 2024

(54) GENERATION AND USE OF APPLICATION TEMPLATES

(71) Applicant: ServiceNow, Inc., Santa Clara, CA (US)

(72) Inventors: Cory Allen Seering, Chicago, IL (US); Arthur Benjamin Kennedy, Chicago, IL (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/805,585

(22) Filed: Jun. 6, 2022

(65) Prior Publication Data
US 2022/0300098 A1 Sep. 22, 2022

Related U.S. Application Data

(62) Division of application No. 17/077,831, filed on Oct. 22, 2020, now Pat. No. 11,354,006.

(51) Int. Cl.
| | | |
|---|---|---|
| *G06F 3/048* | (2013.01) | |
| *G06F 8/35* | (2018.01) | |
| *G06F 8/36* | (2018.01) | |
| *G06F 8/38* | (2018.01) | |

(52) U.S. Cl.
CPC ............... *G06F 3/048* (2013.01); *G06F 8/35* (2013.01); *G06F 8/36* (2013.01); *G06F 8/38* (2013.01)

(58) Field of Classification Search
CPC .................................. G06F 3/048; G06F 8/35
USPC .................................................. 717/120–178
See application file for complete search history.

(56) References Cited

U.S. PATENT DOCUMENTS

| | | | |
|---|---|---|---|
| 6,321,229 B1 | 11/2001 | Goldman | |
| 6,324,647 B1 * | 11/2001 | Bowman-Amuah | ... H04L 51/00 713/153 |
| 6,678,887 B1 | 1/2004 | Hallman | |
| 7,020,706 B2 | 3/2006 | Cates | |
| 7,139,999 B2 * | 11/2006 | Bowman-Amuah | .. G06Q 10/06 717/100 |
| 7,350,209 B2 | 3/2008 | Shum | |
| 7,716,353 B2 | 5/2010 | Golovinsky | |
| 7,769,718 B2 | 8/2010 | Murley | |
| 7,890,802 B2 | 2/2011 | Gerber | |
| 7,925,981 B2 | 4/2011 | Pourheidari | |
| 8,151,261 B2 | 4/2012 | Sirota | |
| 8,402,127 B2 | 3/2013 | Solin | |

(Continued)

OTHER PUBLICATIONS

Tripathy, Abinash, and Santanu Ku Rath. "Application of natural language processing in object oriented software development." 2014 International Conference on Recent Trends in Information Technology. IEEE, 2014. pp. 1-7 (Year: 2014).*

(Continued)

*Primary Examiner* — Satish Rampuria
(74) *Attorney, Agent, or Firm* — FLETCHER YODER PC

(57) ABSTRACT

Techniques are described for the creation of application templates, which can in turn be used to create scoped or customized applications. Such scoped applications may be suitable for use in a local computing environment or a cloud-based platform. As discussed, such scoped or customized applications may be variations of an existing or base application, such as a global or general application or a previously generated scoped application, but may be targeted to a specific audience or function.

18 Claims, 8 Drawing Sheets

(56) References Cited

U.S. PATENT DOCUMENTS

| | | |
|---|---|---|
| 8,612,408 B2 | 12/2013 | Trinon |
| 8,646,093 B2 | 2/2014 | Myers |
| 8,832,652 B2 | 9/2014 | Mueller |
| 9,065,783 B2 | 6/2015 | Ding |
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,557,969 B2 | 1/2017 | Sharma |
| 9,645,833 B2 | 5/2017 | Mueller |
| 9,654,473 B2 | 5/2017 | Miller |
| 9,727,545 B1 | 8/2017 | Segalis et al. |
| 9,766,935 B2 | 9/2017 | Kelkar |
| 9,805,322 B2 | 10/2017 | Kelkar |
| 11,573,844 B2 * | 2/2023 | Duggal .................. G06F 9/542 |
| 11,669,309 B2 * | 6/2023 | Dunn ..................... G05B 19/05 717/109 |
| 11,675,620 B2 * | 6/2023 | Dobrev ................. G06F 9/5038 718/102 |
| 2009/0006467 A1 * | 1/2009 | Visscher ................. G06Q 10/06 |
| 2013/0097478 A1 | 4/2013 | Allison et al. |
| 2013/0339065 A1 * | 12/2013 | Denning ................. G06Q 50/01 705/4 |
| 2015/0186132 A1 | 7/2015 | Oliveri et al. |
| 2020/0097234 A1 * | 3/2020 | Roberts ................. G06F 3/1204 |
| 2020/0233678 A1 | 7/2020 | Seering |
| 2021/0042662 A1 | 2/2021 | Pu et al. |

OTHER PUBLICATIONS

Beckman, Nels E., and Aditya V. Nori. "Probabilistic, modular and scalable inference of typestate specifications." Proceedings of the 32nd ACM SIGPLAN conference on Programming language design and implementation. 2011. pp. 211-221 (Year: 2011).*

Teng, Xiaolin, and Hoang Pham. "A new methodology for predicting software reliability in the random field environments." IEEE Transactions on Reliability 55.3 (2006): pp. 458-468. (Year: 2006).*

Wakatani, Akiyoshi, and Toshiyuki Maeda. "Evaluation of software education using auto-generated exercises." 2016 IEEE Intl Conference on Computational Science , 2016. pp. 732-735 (Year: 2016).*

Sridhara, Giriprasad, Lori Pollock, and K. Vijay-Shanker. "Automatically detecting and describing high level actions within methods." Proceedings of the 33rd International Conference on Software Engineering. 2011. pp. 101-110 (Year: 2011).*

Maruyama, Katsuhisa, and Ken-ichi Shima. "Automatic method refactoring using weighted dependence graphs." Proceedings of the 21st international conference on Software engineering. 1999. pp. 236-245 (Year: 1999).*

* cited by examiner

GENERATION AND USE OF APPLICATION TEMPLATES

CROSS-REFERENCE TO RELATED APPLICATION

The present application is a divisional of and claims priority to U.S. patent application Ser. No. 17/077,831 entitled "GENERATION AND USE OF APPLICATION TEMPLATES," filed Oct. 22, 2020, the disclosure of which is incorporated herein by reference for all purposes.

BACKGROUND

The present disclosure relates generally to different techniques for generating and/or using copies of applications having defined or limited scope.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Customers of such cloud computing services may, as part of their purchased services, have access to applications for performing various organizational functions. In such an example, customer developers may receive requests from multiple business units or groups to create applications similar to those they have already built or to those used by other units or groups. In such circumstances, developers may have to make modifications to existing applications or more general version of an application by going into the platform and finding where to make changes based on each business's specific needs. This process of developing, modifying, and/or customizing applications can be time-consuming and complicated and may be prone to errors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates to techniques for generating application templates and using application templates to create copies of an application (e.g., "scoped" applications) that may be configured for use by a specific group within an organization and/or to perform a limited or targeted function. Such application copies may restrict access to application files and/or data based on the target use or users. Application copies may also be configured or designed to incorporate features, graphics, interface elements, or themes particular to the targeted group of users or organizational unit.

The present disclosure relates various approaches for application template generation and use. In a first aspect, a user may access or request an application template and can define values for a limited set of pre-defined application variables to create the application copy. In certain embodiments, a user may be provided more flexibility in creating the application copy by employing an application template employing modules or other groupings of variables directed to generating "objects" (e.g., metadata records) within the application copy (such as modules related to a graphical user interface (GUI) object, business rule set, target data, and so forth). In such an approach, the objects may be associated with reusable object templates, with application variables defined within each object template for a user to configure to customize aspect of the application copy. In further embodiments, the application template that is configured by the user may be generated in an automated or semi-automated manner by employing an application scanner routine or code to analyze and/or parse existing application source code to identify application variables within an application that may or may not be modified, to test the identified variables, and to output a new application template based on the identified modifiable variables for users to utilize.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
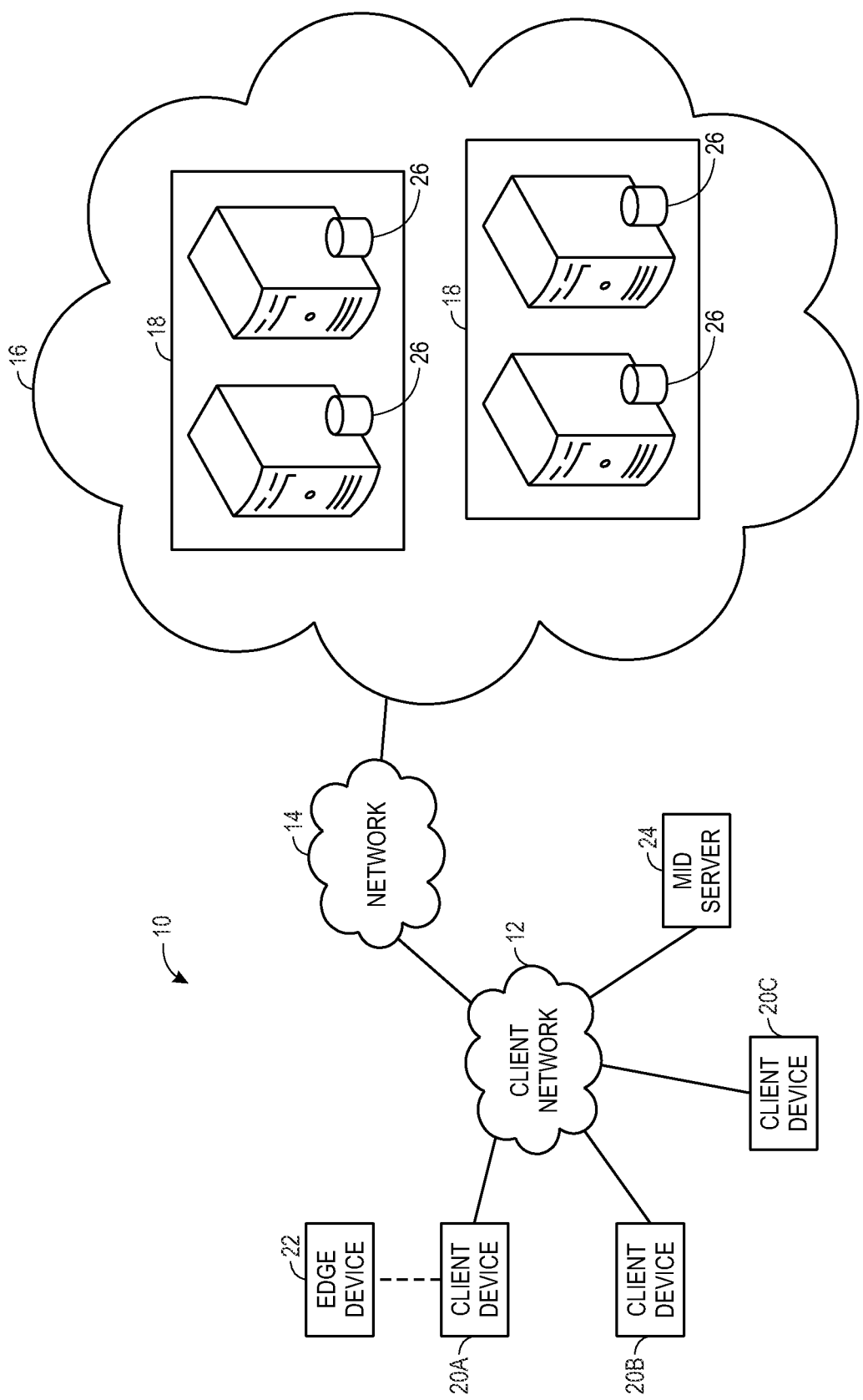
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the terms "application copy", "custom application", and/or "scoped application" refer to applications of limited scope configured for use by a specific group or subset of users within an organization and/or to perform a limited or targeted function in relation to a base version of the application (e.g., a global or general version of the application). By way of example, a base event scheduling application may be used to generate an application copy (e.g., scoped application) for an Accounting department suitable for scheduling budgetary or fiscal due dates or a scoped application for a Human Resources (HR) department suitable for tracking dates tied to an employment start date of an employee. Such application copies may restrict access to application files and/or data based on the target use or users. Application copies may also be configured or designed to incorporate features, graphics, interface elements, or themes particular to the targeted group of users or organizational unit. As used herein, the term "application template" refers to a file or document comprising one or more variables or fields of an application and/or one or more object templates or sub-templates that may be user configured or parameterized to define an application copy of the application. In this context, the term "variable" or "application variable" refers to a configurable element of an application that determines one or more operation and/or presentation aspects of the application, such as, but not limited to, data sources accessible by the application and/or a theme or GUI displayed when the application is used. The terms "object template" or "sub-template" as used herein may be understood to comprise one or more application variables that define or generate an "object" or a collection of "objects" that customize an application copy and/or multiple objects (e.g., metadata records) within the application copy. In practice, an "object template" may encompass or serve as a way of modularly organizing one or more "application variables" which together define or parameterize the respective objects (e.g., modules).

As discussed herein, application development on a computing platform, including a cloud-based platform, is a time consuming and complicated process. Developers may receive requests to create versions of applications that are variations on applications they have been created before. However, even limited changes to an application to create the requested variation may require careful consideration of which existing tables to allow access to or, correspondingly, whether new tables (accessible only by the new application) are to be generated and accessed. Likewise, there may be changes to the executable code to define new or changed features which may affect operation and/or presentation of the new application. The present techniques help address these issues by allowing for the generation of application templates and using an application template for quicker creation of a copy of an application (e.g., a scoped application). The use of such application templates may result in corresponding improvements to resource utilization and hardware efficiency when used to generate and/or configure an application copy, e.g., a scoped application. In particular, processor and/or memory utilization may be improved by the use of such configured, curated application templates and/or the modular organization of application variables using object templates which allow processing power and memory to be devoted only to those aspects of application development deemed necessary for generating an application copy, thereby reducing the processing and memory footprint when using an application template to generate a copy of an application.

With the preceding in mind, the present disclosure relates various approaches to application template generation and/or use. In one embodiment, a limited set of application variables that can be configured by a user are identified in an application. To create an application copy in this context, a user provides values for those application variables in the application template for which their input is requested or allows default values to be employed (e.g., by not providing their own value).

In a second embodiment, different aspects or modules of an application may be identified, each of which includes one or more variables that may be configured by a user and which when defined correspond to an object or collection of objects within the application copy. By way of example, an object may relate to a user interface, a business rule set, one or more data sources, and so forth. A user may then select which objects to customize and input values for the application variables associated with or organized within corresponding object templates defined within the application template to generate the application copy.

In a further aspect, application template generation for an application may be automated or semi-automated. In one example, a scanner application or routines may be executed to process the source code of a base application to identify all potential application variables that may be suitable for inclusion in an application template. Further, such a scanner application or routines may distinguish between those application variables that must be included in an application template (i.e., must be defined by a user in order to have a usable application copy) and those application variables that are optional (i.e., that a user may choose whether to configure or not configure). Optional application variables may be included or excluded from the application template based on a manual selection process to include or exclude them or based upon historic patterns or observations for a given organization (e.g., a given application variable may always be set to a certain value within the organization or may never be provided as a configurable application variable). Likewise, in certain implementations certain application variables not identified by the scanner application or routines may be manually added to an application template based on an organizational or user preference.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., a unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
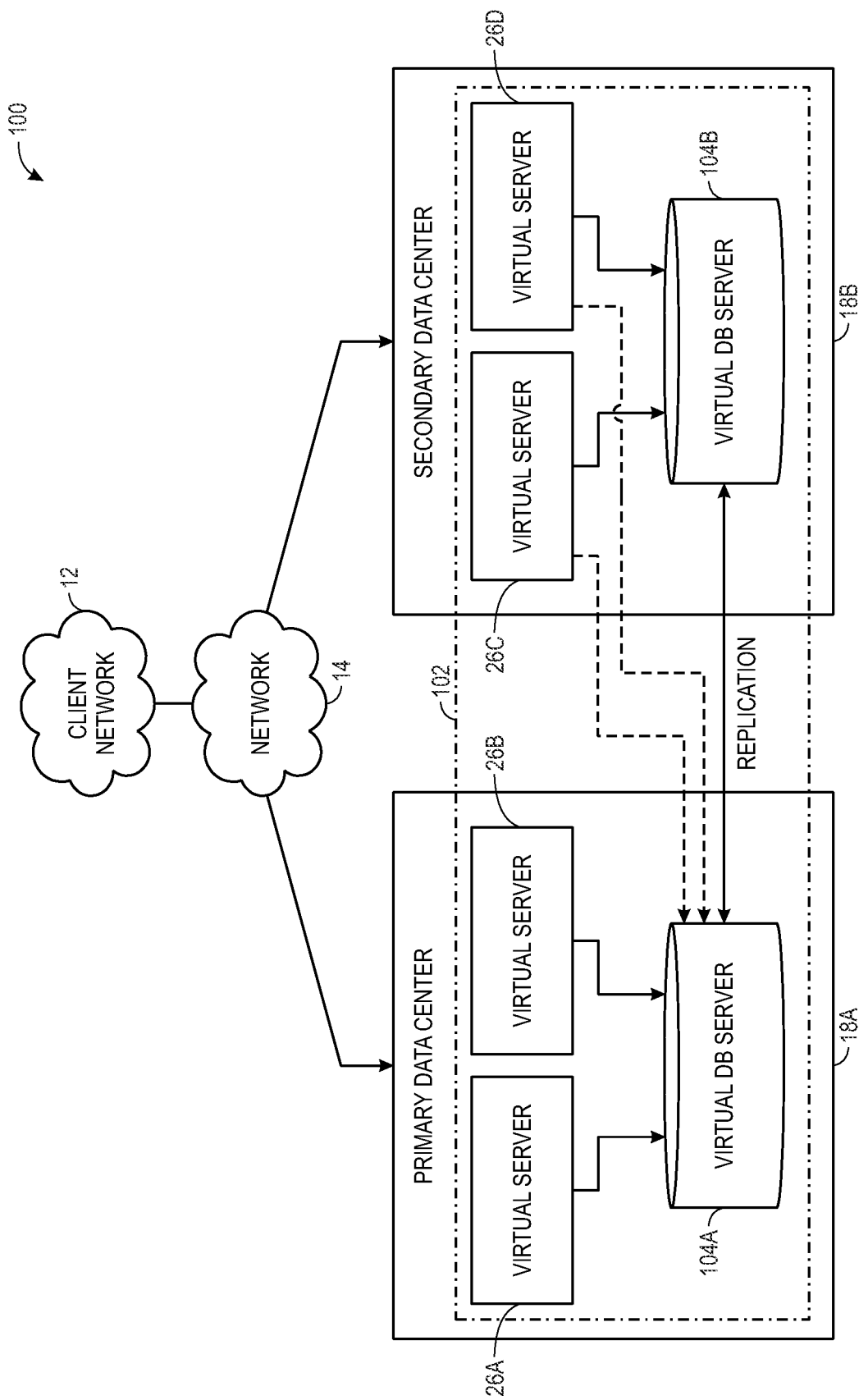
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
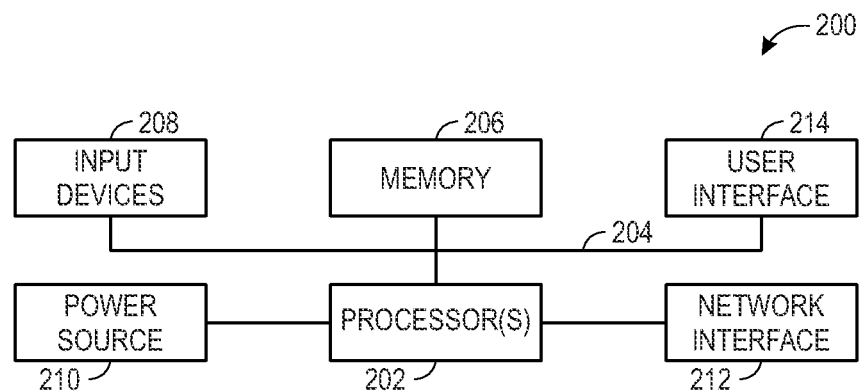
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
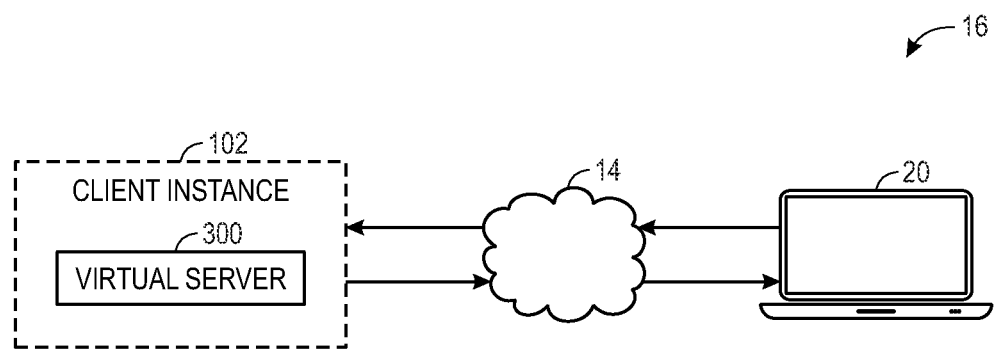
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2 and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Turning to FIGS. 5-11, approaches are described for both creating and using an application template to create a copy of an application, such as a scoped or custom application, which may be suitable for use in a local computing environment or a cloud-based platform as described herein. In practice, such scoped or customized applications may be variations of an existing or base application, such as a global or general application or a previously generated scoped application, but may be targeted to a specific audience or function. By way of example, a general ticket management application may be used to generate an application template that in turn may be used to create a scoped incident management application for a Customer Service group, a reservation application for a Fleet Management group, a package delivery tracking application for an inter- or intra-office Mail Services group, and so forth. With the preceding cloud platform discussion in mind, it may be appreciated that in practice a given client instance may be specific to a respective customer or client, or to a unit or group within such a customer or client, and that generation of application templates as discussed herein (and their use to generate scoped or custom copies of an application) may be specific to a respective client instance, such that users of a given client instance have access to those specific templates and/or derived scoped applications while users in other client instances do not. That is, application template generation and use may, in certain implementations, be client instance specific.

In a further aspect, in certain embodiments a user may also be provided with the capability of creating templates for "objects". In this context, an object template may be a reusable sub-template for generating metadata associated with an application copy. Such object templates can be included in an application template, as described herein and may allow something more targeted in scope than a generic application to be created or modified. By way of example, when object templates are included as sub-templates within an application template, new metadata records may be generated based on user inputs mapped and applied to corresponding application variables associated with a respective object template. In practice, such object templates may organize or compartmentalize application variables related to a respective object or group of objects such that creation or modification of such object may be handled in a modular fashion (e.g., objects related to a GUI module, to a data source module, and so forth), such that a user may select which objects or modules to customize when generating an application copy.

Figure 5:
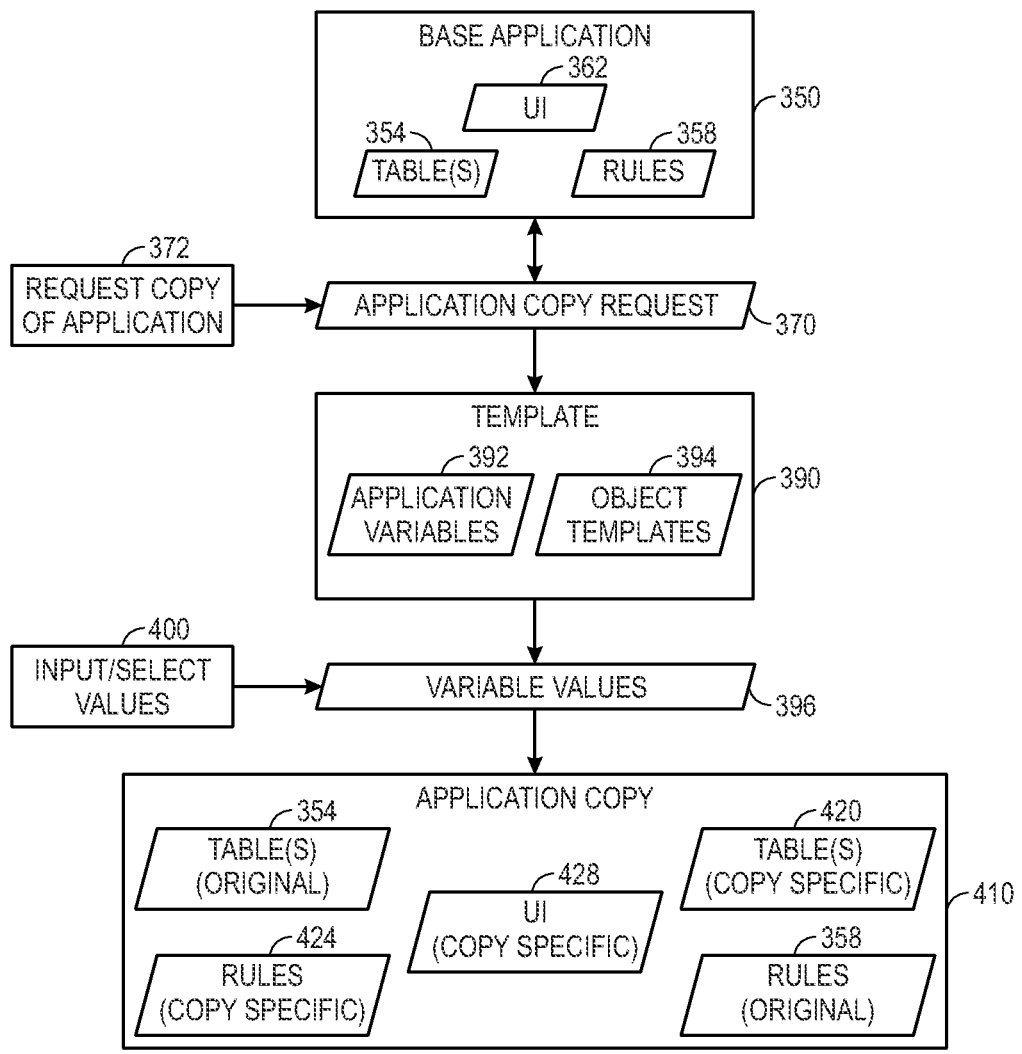
FIG. 5 is a process flow depicting steps in an implementation of generating an application copy using an application template, in accordance with aspects of the present disclosure.

With this in mind, and to facilitate explanation, FIG. 5 depicts data objects and process steps related to using an application template 390 to create an application copy 410 in a process flow format. In this example, a base application 350 is provided that includes one or more defined tables 354 or table types. Such tables 354 may store records generated, referenced, and/or otherwise manipulated by the base application 350 in performing a function related to the base application 350. The base application 350 in this example is also depicted as including logic or rules 358 (e.g., business rules) defining operation, execution, and function of the base application 350 as well as a user interface (UI) 362, such as a graphic user interface (GUI), defining elements by which a user may interact with the base application 350. By way of example, the UI 362 may include or utilize pre-defined forms, lists, and/or queries by which a user may interact with or invoke table(s) 354 and/or rules 358 to perform operations supported by the application. As will be appreciated, certain of these features and their corresponding functions may be absent, truncated, extended, or combined in a copy 410 made of the base application 350 depending on the specific implementation and use of the application copy 410. In practice the base application 350 may actually be a model or generic application that is not actually used, but instead typifies those features that may be present in idealized application of a given type such as event tracking, ticket generation and/or management, calendar management, and so forth. Conversely, the base application 350 may instead be a production application representative of its type or function and which can be generalized to other uses or functions.

In the depicted example, an instruction or request 370 to generate a modified version of the base application 350, denoted an application copy 410 herein, is made (step 372). In response to this request 370, an application template 390 is generated or, if previously generated, accessed from a data storage structure(s). In this example, the application template 390 includes or defines one or more application variables 392, which as used herein correspond to variables or values capable of being defined (e.g., assigned a respective value) by a user so as to allow an application copy 410 to be generated that is distinct from the base application 350, such as being of a limited, defined, or specialized scope. By way of example, application variables may constitute table names for new tables to be used or access by the application copy 410, changes or customizations to rules 358, changes or customizations to the UI 362, and so forth.

In addition, as shown in FIG. 5, in certain embodiments discussed herein the application template 390 may additionally or alternatively include one or more object templates 394 (e.g., sub-templates) as described herein, which in one implementation may be used to generate metadata records relevant to an application copy 410 based on user inputs. The application template 390 of FIG. 5 is shown with both application variables 392 and object templates 394 for completeness, though in practice some or all of the application variables 392 may be organized within object templates 394, as discussed herein. In this manner, organization of some or all of the application variables 392 may be modularized, such as to correspond to one or more objects associated with the application copy 410 such that a user may selectively choose which objects to include or modify in the application copy 410.

In the depicted flow of FIG. 5, for the application variables 392 included in the application template 390 (whether provided as stand-alone or as part of respective object templates 394), a user may input or select (step 400) values 396 to define (e.g., assign respective values for) one or more of the respective application variables 392. By way of example, the user may input or select values 396 for application variable(s) 392 using a displayed GUI or other UI that provides fields or other input locations configured to receive such inputs or selections. In certain implementations, a user may opt to not define an application variable 392 of those available and instead a default variable value may be employed in the absence of a user input or selection. Such default variable values may be based on historical or prior data corresponding to prior choices or trends associated with a given application variable 392 observed in the population at large or at a particular organization or may be defined by a developer for a given base application 350. Conversely, for some application variables 392, a user may be required to provide a value 396 in order for the application copy 410 to be generated.

Based on the provided variable values 396 (or default values if no user selection or input is received), a customized application copy 410 is generated. As used herein, the customized application copy 410 may constitute a scoped application or otherwise targeted or limited scope application providing functionality of the base application 350 in a particular context, such as for a particular business unit or group or to address a particular business need or function. In this manner, the general functionality provided by the base application 350 may be customized to accommodate a specific function or need. By way of example a general ticket generation base application may be customized to generate an incident tracking scoped application for a customer service business group.

In the depicted example the application copy 410 may include or incorporate aspects of the base application 350 as well as aspects particular to the application copy 410. By way of example, the application copy 410 may access or use one or more tables 354 or table fields specified by the base application 350 as well one or more tables 420 or table fields accessed or used only by the application copy 410. Similarly, the application copy 410 may include logic or rules 358 present or defined in the base application 350 as well as logic or rules 424 specific to the application copy 410. In the depicted example the application copy 410 also includes a UI 428 specific to the application copy, though in practice the UI may be the same as in the base application 350. Indeed, though an example is depicted in FIG. 5 in which the application copy 410 has elements of the base application 350 and customized table, rule, and UI elements, in practice the degree or extent of customization may vary considerably. For example, at one extreme virtually all of the elements of the base application 350 may be reproduced in the application copy 410 except for one application variable 392 being configured with respect to one of the tables, UI, or rules. In contrast, in other contexts, no original (i.e., shared) tables may be retained and the UI and rules may be customized to some or a considerable extent.

Figure 6:
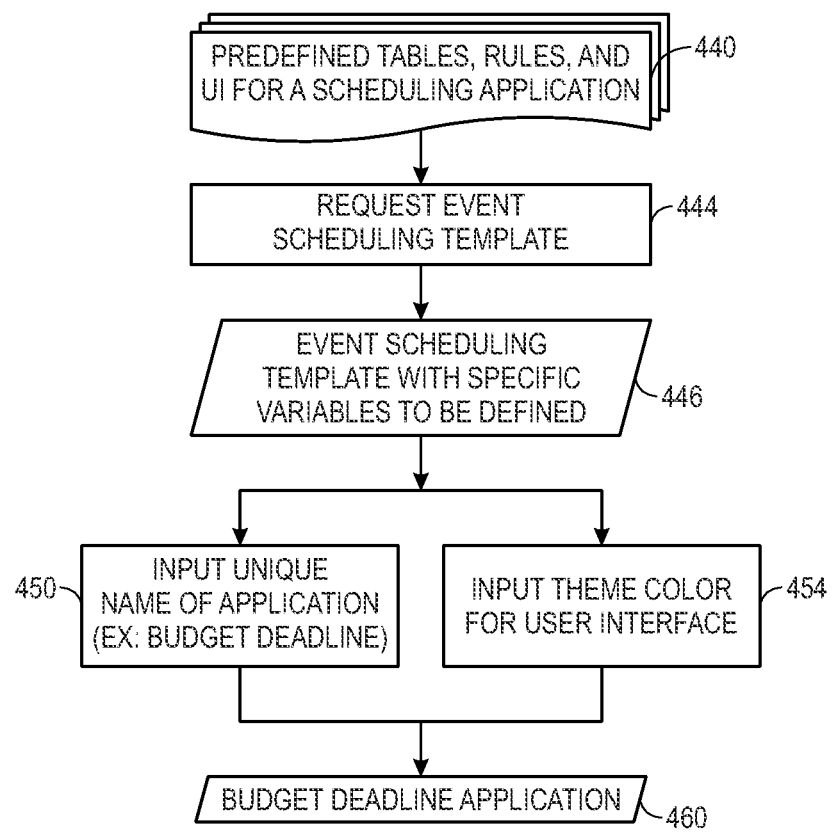
FIG. 6 is a process flow of an example for generating an application copy from an application template, in accordance with aspects of the present disclosure.

Turning to FIG. 6, an example is provided of how one such process of creating a scoped application may work in practice. In this example a base scheduling application having a predefined set 440 of tables, rules, and UI is provided. In response to a request 444, an event scheduling application template 446 is accessed. The event scheduling template 446 includes application variables to be defined by a user to generate a scoped event scheduling application. In this example, one variable is a unique name 450 for the scoped application (which may be used to characterize tables accessible to and used by the scoped application). In FIG. 6, the name for the scoped application is Budget Deadline. Another variable depicted is for a theme color 454 to be used for a UI of the scoped application, so as to create a distinct visual interface for the scope application. Based on at least these defined variables, a scoped application 460, here a Budget Deadline Application, is generated providing specific functionality to perform a respective task or support a respective business group or unit.

With the preceding general example of the use of an application template 390 to generate an application copy 410 in mind, it may be beneficial to give practical examples of different approaches for the generation and use of certain application templates 390. By way of example, one approach (i.e., a "procedural" approach as denoted herein) utilizes an application template 390 having a limited number of defined application variables 392 to generate an application copy 410. In one such embodiment related to creating an application copy 410, existing and custom actions may be mixed in a single design or process flow that may be performed to generate a scoped application and its metadata. A user executing the flow may provide values for one or more application variables 392 in response to prompts from the executing flow. Based on the execution of the flow and the provided variable values 396 various results may occur including one or more of: generation of a scoped application (e.g., application copy 410), creation of multiple tables within the scoped application, insertion of metadata into records of the scoped application, execution of more complex actions that generate metadata as defined by respective metadata structures.

Figure 7:
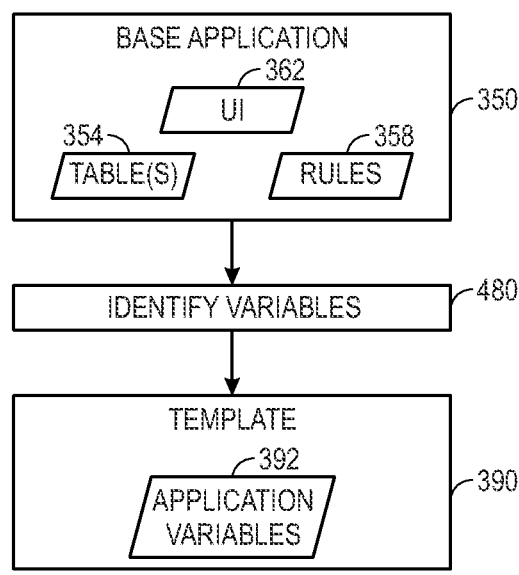
FIG. 7 is a process flow depicting steps in an implementation of generating an application template from a base application, in accordance with aspects of the present disclosure.

Certain aspects of creating an application template 390 for use in accordance with this approach are shown in FIG. 7. As shown in FIG. 7, a base application 350 is initially available that includes table(s) 354, a UI 362, and/or rules 358 (which may be in the form of processor-executable code or logic). In this example, definable variables 392 in the base application 350 are identified (step 480) or otherwise selected for inclusion in the application template 390. As discussed herein, application variables 392 are user definable values that parameterize or otherwise configure some aspect of the base application 350 (such as aspects related to the table(s) 354, UI 362, and/or logic or rules 358) so as to allow an application copy 410 to be generated having a specific or targeted function or scope relative to the base application 350. In the depicted example of FIG. 7, a curated set of application variables 392 may be identified and selected (step 480) for inclusion in the application template 390. That is, in this example, not all possible application variables 392 are identified or selected to be made available to a user of the application template 390. Instead, a select set of available or possible application variables 392 are selected, such as by a developer or organization manager or based on historical patterns or trends for variable selection for a given organization, such that a user may configure a select, but limited, set of features of the base application 350 to generate an application copy 410. Alternatively, the select set of available or possible application variables 392 may be selected based on organizational guidance or policies that specify the application variables 392, or types of application variables 392, that a user may be allowed to configure when generating an application copy 410.

For example, application variables 392 may be selected for inclusion in the application template 390 that allow a user to specify a name for the application copy 410 (thus allowing tables specific to the copy to be created and named) and/or a graphical theme associated with a UI of the application copy 410. Conversely, application variables 392 that would affect substantial changes to the base application 350 or which might require substantial development or integration to assure seamless operation of the application copy 410 might be excluded from the application template 390. In this manner, oversight might me asserted to limit the type and/or extent of modification to the base application 350 that may be allowed in generating a respective application copy 410. This may be particularly useful in contexts where the copies 410 derived from the base application 350 are to remain close in functionality, appearance, or use to the base application 350, but where limited changes are to be allowed for customizing the application functionality for a given group or purpose.

In another implementation, a "composable" approach may be employed which employs one or more reusable templates (e.g., object templates 394 or sub-templates as discussed herein) that may be used to generate or modify a single "object" or collection of "objects". By way of example, such objects may include (but are not limited to) a record producer, a task extension for (such as for a record producer to insert records into), a navigator menu item, a role, and so forth) that are composed together in a reusable manner using the object templates 394. In practice, object templates 394 within an application template may be run or processed sequentially to generate an application copy 410 and/or multiple objects (e.g., metadata records) within the application copy 410.

Figure 8:
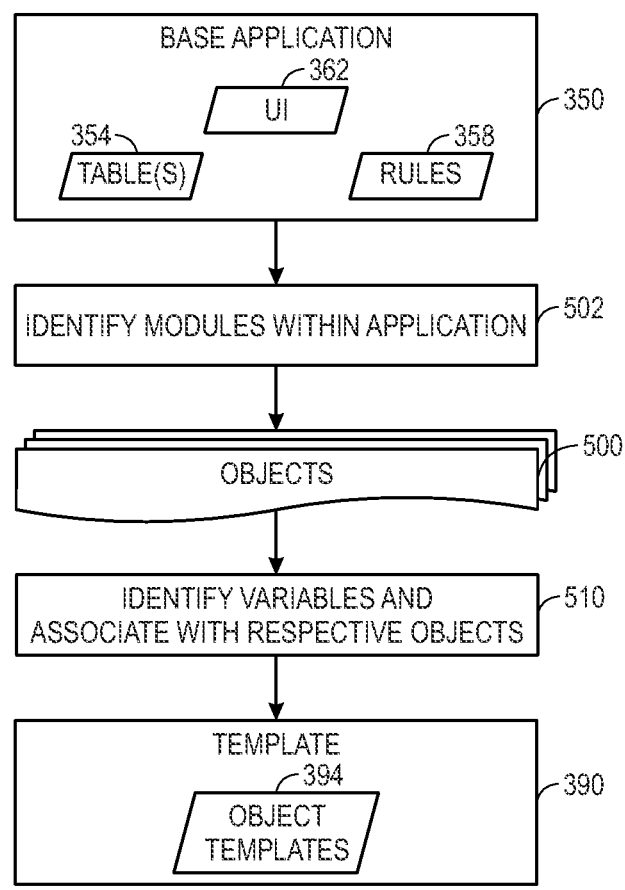
FIG. 8 is a process flow depicting steps in an implementation of generating an application template having object templates or sub-templates (e.g., modularized application variables), in accordance with aspects of the present disclosure.
Figure 9:
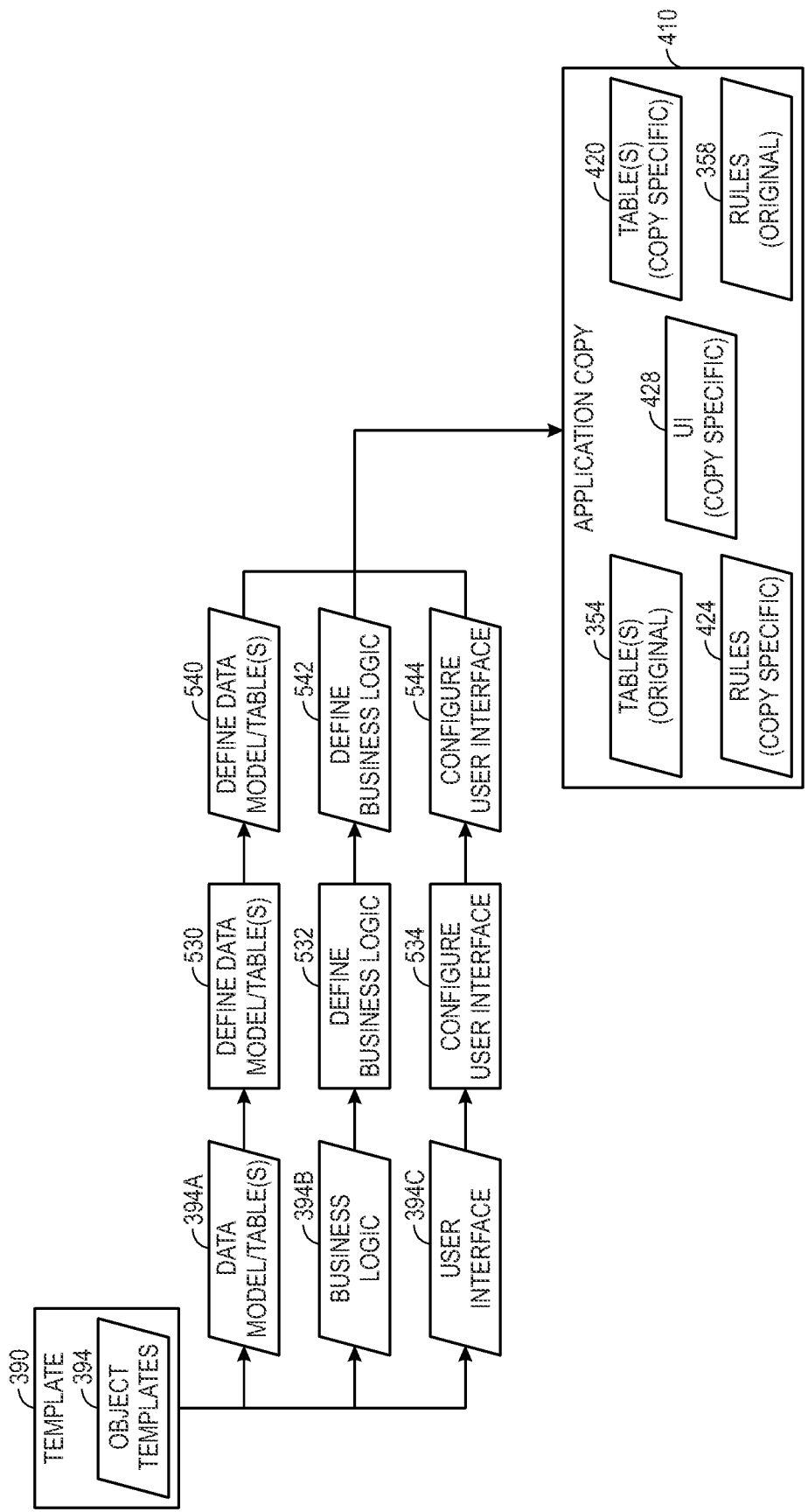
FIG. 9 is a process flow of an example for generating an application copy from an application template having object templates, in accordance with aspects of the present disclosure.

With this in mind, and turning to FIG. 8, an example of a conceptual process flow for generating an application template in accordance with this approach is illustrated. In this example, related features or aspects of the application may be grouped into objects 500, which may be characterized conceptually as modules (e.g., related feature sets). Application variables 392 relevant to a given object 500 may be identified and associated with the respective object 500. Thus, turning to the figure, a base application 350 may be initially provided, as discussed in the preceding example. One or more objects 500 may be identified (step 502). Objects 500 may be identified based on an operation, function, or other aspect of the base application 350 that may be customized as part of defining an application copy 410, and which therefore may be incorporated into the application template 390. As discussed herein, each object 500 may have one or more associated application variables 392 identified at step 510, such as based upon a developer's determination and/or based upon where or how a given application variable 392 is defined and used in the executable code of the base application 350. In the depicted example, application variables 392 are organized or grouped into objects 500 within the application template 390 as object templates 394 (e.g., sub-templates), which provide a modular approach to organizing and/or approaching creation of an application copy 410.

By way of example, an object 500 may be defined for all or part of a UI 362 of the application, with associated application variables 392 associated with the UI module for configuring aspects of the UI, such as a visual theme, color palette, font size and/or style, default placement of the UI when opened, whether the UI runs in full screen or windowed modes, and so forth. Selection of the UI module by a user of the application template 390 in this example might, therefore, allow the user to provide inputs or selections defining some or all of the application variables associated with the UI module. Conversely, if the user does not select the UI module from the application template 390 to configure, default values for the UI 362 from the base application 350 may instead be employed in the application copy 410 that is generated. Other examples of possible objects 500 or modules may include, but are not limited to, objects related to data sources, user or group permissions, security and permissions, data integrity and/or back up, business unit or business rules, form or query layout and design, and so forth. That is, any aspect, function, or operation of the application for which multiple application variables 392 may be identified that relate to that aspect, function, or operation and for which customization by a user is determined to be suitable may be grouped as a module, which may be embodied as one or more objects 500. The objects 500 may then serve as a hierarchical level of selection (via incorporation into the application template 390 as object templates 394) during generation of an application copy 410 such that a user may or may not select a given object 500, and thereby the corresponding application variables of the given object 500, for customization.

In this manner, customization of different aspects of an application copy 410 may be modularized so as to avoid overwhelming a user with possible customizations and options, many of which may be of no interest to the user. This is further illustrated in FIG. 9, in which an application template 390 is provided for generation of an application copy 410. In this example, the application template 390 includes a number of defined object templates 394. For the purpose of illustration, the example illustrates the selection of a first object template 394A related to a data model or tables (e.g., data sources), a second object template 394B related to business logic (e.g., one or more rules configurable by the user), and a third object template 394C related to a user interface (e.g., a theme or other aspect of a GUI). Each object template 394 may be include one or more application variables 392 related to the function or operations associated with the respective object 500. Based on the selected object templates 394 a user may then provide inputs or selections to define some or all of the application variables 392 associated with the selected object templates 394. In this example, the inputs or selections of the user define or specify the data model/table(s) (step 530), define or configure the business logic (step 532), and configure the user interface (step 534) yielding, respectively, a defined data model/ table(s) 540, defined business logic 542, and a configured UI 544. These defined and configured application features may then be included, along with features of the base application 350 as appropriate, in the application copy 410 as discussed herein.

By way of a further example relating operational aspects of a composable approach to creating an application copy as discussed herein and in order to provide a real-world context, an additional example is provided. In this example, a user may choose to generate an application template 390 from a base application 350, such as a request-approval task application in which an initial request is submitted for some task to take place. In such an application, an approval may be generated in response to the request and the task may be assigned once the approval is complete. For such an application, certain features may be needed such as, but not limited to: (1) a new table which extends "Task"; (2) a mechanism to insert an approval (e.g., a sysapproval) and assign it dynamically (e.g., a flow, a workflow, approval rules, business rules, and so forth); and (3) form and/or list layouts.

In practice, the majority of the metadata needed for copies 410 of applications created from application templates 390 (e.g., scoped applications) may be identical between copies 410, except for selections or choices needed to define the scope of the application copy 410 (e.g., "the table applies to . . . ", "the assignment group to use the application is . . . ", and so forth). As described herein, the metadata can be collected as application variables 392 and applied to new metadata records to generate a respective application copy 410, such as a scoped or targeted copy of a request-approval task base application in the present example that has minor variations from the base application 350 and other respective copies 410 of the base application 350 (e.g., other related scoped applications).

In the present example, the application template 390 for the request-approval task application may consist of one or more object templates 394 (e.g., sub-templates) which may be configured to create the associated metadata records for the features or variables deemed necessary (or optional) for defining the scope of the application copy 410. By way of example, in the present context the sub-templates for a scoped version of a request-approval-task application may include: (1) an object template that creates a table; (2) an object template that creates a business rule for the table that generates an approval (e.g., sysapproval) on insert; and (3) an object template that copies the default Task form and list layouts from the base application 350 and adds the user defined new fields (if any) to the form and/or list layouts. Thus, in this example, the general structure of the application template 390 may be characterized as:

Request-Approval-Task Application Template
Table Object Template
Business Rule Object Template
List/Form Layout Object Template The result of running this application template 390 composed of multiple object templates 394 is a new scoped application (i.e., application copy 410) that contains an extension of the Task table, business logic for approvals, and a default form and list layout. This application template 390 can then be used to generate a scoped application providing request-approval-task functionality in a context specific to a respective organizational unit and/or group of users.

In a practical implementation of the "procedural" or "composable" approaches described in the preceding discussion, one or more software plugins may be used to implement aspects of the application template generation and use. For example, an application template plugin may be employed that contains the data model and associated code associated with application templates 390. The code used in the application template plugin, when executed, may provide a user with the ability to do one or more of: compose templates and associated process flows, run application programming interface (API) calls to execute application templates 390 and to check on the status of running templates, attain access to template-related tables, APIs, and platform scrips via a template runner or template author role.

In certain implementations the application templates plugin may include one or more tables. Examples of such tables include. but are not limited to: a template table, a template definition table, a template function type table, a subtemplate (e.g., object template) table, a template input variable table, a template input variable instance table, a template output variable table, a template output variable instance table, a temple instance table, a template flow instance table, and a template manifest table. In such an example, a template table may include fields for a template name, a template description, a Boolean value for determining whether the application template creates an application copy with objects inside of it or add pre-configured object to an existing application, a Boolean value for determining whether the application template will be shown to users or provided as an executable, and a reference to the current active implementation of the application template. A template definition table may include fields for a Boolean value for determining whether this is the active version of the implementation for the associated application template, an author, name for disambiguating multiple implementations of the same application template, a version of the application template, an icon for display in an interface, a template field referencing to the application template from the template table that this definition is an implementation of, a screenshot field, a worknotes field, an additional users field, a details field, a function type list, a metadata list, a UX framework component field, a URL field, and a table field which may reference a standard form in the platform to collect user input, and so forth. A template function type table may be used to categorize application templates (e.g., this is a finance application, this is a ticket generation application, and so forth) and may include fields for names of function types, and descriptions of function types. A subtemplate table may include fields for a link to the definition for the associated application template, a parent template field for keeping track of the top level parent of a hierarchy of subtemplates, and an order field which provides an order in which subtemplates are executed if more than one is present.

A template input variable table may define the available variables that will be used as inputs to the application template's subflows and which may thereby be passed to keys in a "variables" object passed into the body of template runner API call. Such a table may include fields for which template definition this acts as an input for, a name of the variable, a description of the variable, a default value to use for the field, a Boolean value determining if an input value is mandatory, and a list of choices for the type of the variable passed into the template runner API. A template input variable instance table may keep track of the variable values a user has passed to the template runner API and may include fields for a template instance (specifying the instance or running application template this is an input for), a name of the variable, and a value of the variable as collected from the user or as specified by default (and which will be passed as the input to an executing process flow for creating an application copy). A template output variable table may define the output variable(s) that make up the output of an application template (and associated subflows). Such a template output variable table may include fields for which template definition this acts as an output for, a name of the variable, a description of the variable, a default value to use for the field, and a list of choices for the type of the variable passed into the template runner API. A template output variable instance table may indicate the values of the output from associated subflow action for an instance of a running application template and may include fields for a template instance (specifying the instance or running application template this is an input for), a name of the variable, and a value of the output variable computed from the outputs defined on actions in the associated template's subflow. While the preceding in intended to provide a concrete example corresponding to real-world implementations, it should be appreciated that such table and field examples are not limiting and, indeed, any suitable combination of tables, fields, API's, classes, and so forth may be employed for implementing the techniques described herein.

Figure 10:
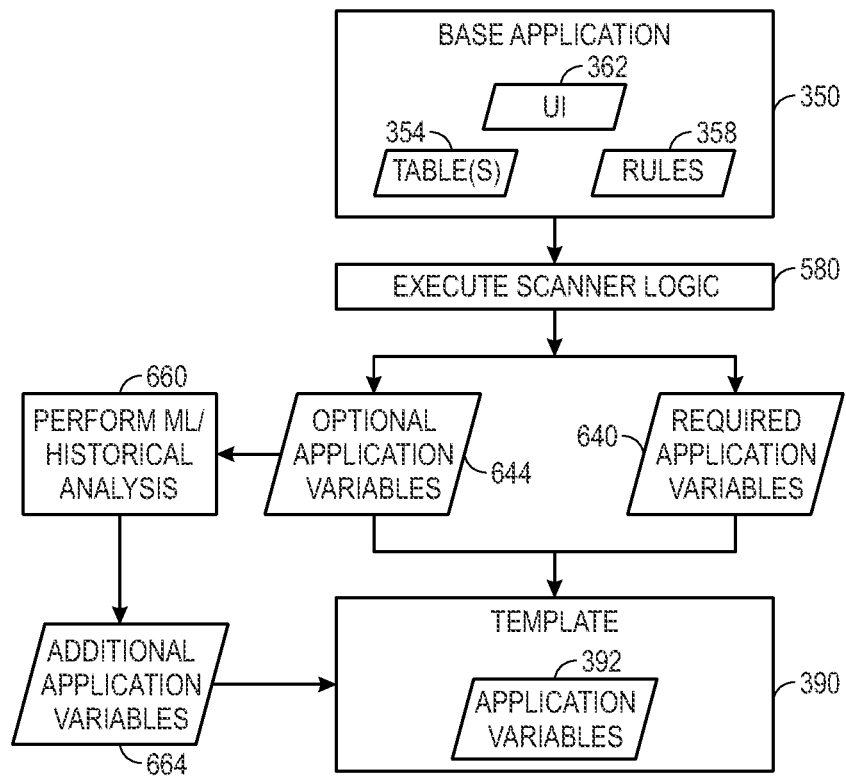
FIG. 10 is a process flow depicting steps in an implementation of generating an application template using automated scanning, in accordance with aspects of the present disclosure.
Figure 11:
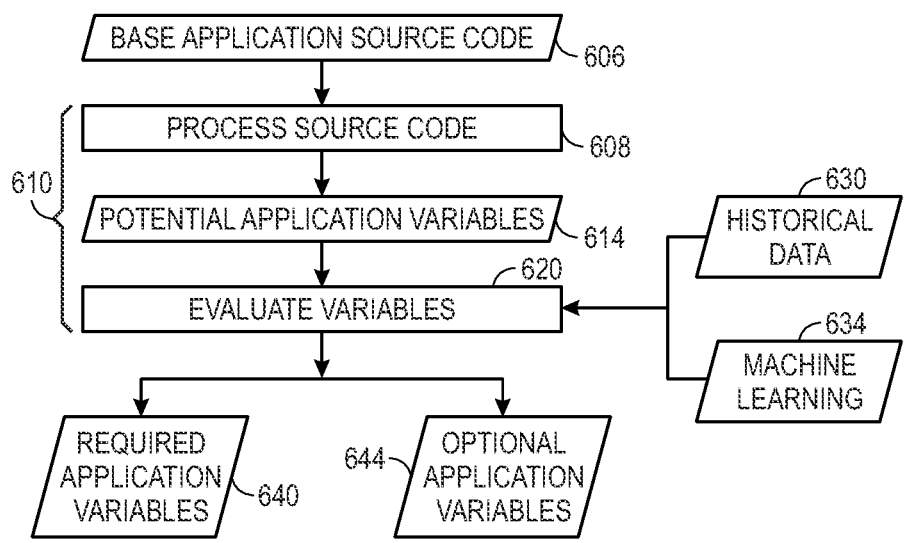
FIG. 11 is a process flow of an example for base application source code to identify potential application variables, in accordance with aspects of the present disclosure.

Turning to FIGS. 10 and 11, a further approach to generating an application template 390 (herein denoted as a "payload and map" approach) is described. In the example of FIG. 10, processor-executable logic is employed to scan (step 580) the base application 350 to identify all possible application variables. Turning to FIG. 11, an example of a scan logic process 610 is depicted in process flow form. In this example, the scan logic parses (step 608) the executable code (e.g., source code 606) of the base application 350 to identify potential application variables 614. Such identification may be based on syntactical analysis, pattern comparison against known patterns for which variable relationships have been established, explicit or implicit designation of variables within the code, and so forth.

Based on logical rules and/or historical application customization data 630 (e.g., trends or prior application customization data for a given organization), the potential application variables 608 are evaluated (step 620). In the depicted example, the potential application variables 614 may be characterized by the evaluation step 620 as required variables 640 or optional variables 644. The required application variables 640 are those that must be included in the application template 390 to generate a working application copy 410. For example, for certain applications, it may be necessary for the application copy 410 to reference tables or data specific to the copy and not shared with other related applications or the base application 350. In such an example, it may be necessary for the user to provide a "Name" for the application copy 410 so that tables may be generated specific to the copy. Similarly, for a scoped application, variables that specify data sources, users or user privileges, required fields, and so forth may be characterized as required for generation of an application copy 410. Conversely, optional application variables 644 may be optionally included in the application template 390, such as based on historical preferences of an organization to allow customization of a respective variable. In the depicted example, machine learning 634 may be employed in addition to or instead of other analysis to determine whether an application variable is optional or required and, if optional, whether the optional application variable 644 is included in an application template 390. For example, such machine learning 634 may be based on various learning approaches to incorporate historical trends or patterns, prior behavior of a given user, prior selections or customizations by a respective business unit or group, and so forth.

Turning back to FIG. 10, the identified required application variables 640 and optional application variables 644 may be incorporated into the application template 390 for the base application 350. Inclusion of optional application variables 644 in the application template 390 may be based on historical or machine learning based analysis 660. Further, such historical or machine learning based analysis 660 may also be employed to identify additional application variables 664 not identified by the scanner logic but which are to be included in the application template 390. Alternatively, such additional application variables 664 may be known to a developer or user and included in the application template 390 due to addition by the developer or user. Such additional application variables 664 may represent variables that cannot be parsed from the source code 606 of the base application 350, but which nevertheless are available to be defined by a user to define the scope or operation of an application copy 410.

In a practical implementation of the "payload and map" approach described in the preceding discussion, one or more software plugins may be used to implement aspects of the application template generation and use. For example, an application template plugin may be employed that contains the data model and associated code associated with implementing a payload and map approach. The code used in the application template plugin, when executed, may provide a user with the ability to generate application templates and copies of applications in accordance with the payload and map approach discussed herein.

While the preceding provides a high-level overview of such a "payload and map" approach, a practical example of one implementation is also provided below to provide a real-world context. In this example, an existing application (e.g., a base application 350) is used to generate a serialization of all the records that belong to that application and those records are placed into new tables. Variables are automatically identified within these records, such as while or after the records are being serialized, using one or more code-implemented evaluation criteria, such as by looking at individual fields and determining if they are table-pickers, references, display values, have names like "name" or "title", and so forth.

This information may be used during creation of an application copy 410 to "map" variables values 396 provided by a user executing the template 390 into serialized data. When the data is subsequently unserialized, a copy 410 of the base application is the result which has the user's changes applied. By way of example, variable collection by a user may employ a "wizard" interface providing fields for users to enter variable values 396 across one or more screens of context. At the end of collecting the variable values 396, the wizard will submit the information about which application template 390 to run and the variable values 396 collected from users to a back-end template runner (e.g., a scriptable template runner) which executes to create the application copy 410. It should be appreciated, however, that in other embodiments a wizard may not be employed and other mechanisms (e.g., a Catalog item, from a bespoke UI Page, from a regular form in the platform, etc.) may be provided to acquire variable values 396 and provide such values to an automated process for creation of an application copy 410.

With the preceding in mind, the techniques presently disclosed can be used in the creation of application templates, which can in turn be used to create scoped or customized applications. Such scoped applications may be suitable for use in a local computing environment or a cloud-based platform. As discussed, such scoped or customized applications may be variations of an existing or base application, such as a global or general application or a previously generated scoped application, but may be targeted to a specific audience or function. In this manner, use of computing resources, as well as personnel resources, may be streamlined to and reduced in the development and deployment of targeted application copies supporting specialized functions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computer-implemented method comprising:
   accessing a base application comprising one or more of a user interface (UI), one or more tables, or one or more rules, wherein the UI, the one or more tables, or the one or more rules comprise a plurality of application variables that configure operation of the respective UI, tables, or rules;
   selecting one or more application variables from the plurality of application variables, wherein the one or more application variables are configurable elements of the base application that can be parameterized to generate application copies of the base application;
   generating or configuring an application template comprising the one or more application variables;
   determining one or more object templates corresponding to respective metadata used to define a customized application copy of the base application; and
   assigning each of the one or more application variables to a respective object template, wherein the application template further comprises the one or more object templates such that the one or more application variables are organized using the one or more object templates.

2. The computer-implemented method of claim 1, wherein the application template, when used to generate an application copy, prompts a user for inputs corresponding to each of the one or more application variables.

3. The computer-implemented method of claim 1, wherein the one or more application variables selected from the plurality of application variables are selected based on one or more of a historical pattern or trend related to application variable selection or utilization for an organization.

4. The computer-implemented method of claim 1, wherein the one or more application variables selected from the plurality of application variables are selected based on organizational guidance or policies that specify the application variables or types of application variables that may be configured when generating an application copy.

5. The computer-implemented method of claim 1, wherein each object template corresponds to a set of related features or metadata.

6. A non-transitory, computer-readable medium storing code executable by one or more processors of a computing system, wherein the code, when executed, causes the computing system to perform operations comprising:
   determining one or more object templates corresponding to respective metadata used to define a customized application copy of a base application;
   parsing source code of the base application to identify a set of potential application variables;
   determining one or more required application variables from the set of potential application variables, wherein the one or more required application variables are configurable elements of the base application that can be parameterized to generate application copies of the base application;
   assigning each of the one or more required application variables to a respective object template; and
   generating or configuring an application template comprising the required application variables and the one or more object templates such that the one or more required application variables are organized using the one or more object templates.

7. The non-transitory, computer-readable medium of claim 6, wherein the code, when executed, causes the computing system to perform operations comprising:
   determining one or more optional application variables from the set of potential application variables; and
   generating or configuring the application template to further comprise some or all of the optional application variables.

8. The non-transitory, computer-readable medium of claim 7, wherein the one or more optional application variables are determined from the set of potential application variables based using one or both of a historical preference of an organization to allow customization of a respective variable or machine learning.

9. The non-transitory, computer-readable medium of claim 6, wherein the code, when executed, causes the computing system to perform operations comprising:
   receiving an indication of one or more additional application variables that are not included in the set of potential application variables; and
   generating or configuring the application template to further comprise some or all of the additional application variables.

10. The non-transitory, computer-readable medium of claim 9, wherein the one or more additional application variables are identified using historical patterns or trends or machine learning.

11. The non-transitory, computer-readable medium of claim 6, wherein the set of potential application variables are identified based on one or more of syntactical analysis, pattern comparison against known patterns for which variable relationships are established, or explicit or implicit designation of variables within the source code.

12. A non-transitory, computer-readable medium storing code executable by one or more processors of a computing system, wherein the code, when executed, causes the computing system to perform operations comprising:
   determining one or more object templates corresponding to respective metadata used to define a customized application copy of a base application;
   parsing source code of the base application to identify a set of potential application variables, wherein the set of potential application variables are organized within the one or more object templates, and wherein each object template of the one or more object templates corresponds to a set of related metadata;
   determining one or more required application variables from the set of potential application variables, wherein the one or more required application variables are configurable elements of the base application that can be parameterized to generate application copies of the base application;
   assigning each of the one or more required application variables to a respective object template; and
   generating or configuring an application template comprising the required application variables and the one or more object templates such that the one or more required application variables are organized using the one or more object templates.

13. The non-transitory, computer-readable medium of claim 12, wherein the one or more required application variables comprise variables that specify data sources, variables that specify user privileges, variables that specify required fields, or any combination thereof.

14. The non-transitory, computer-readable medium of claim 12, wherein the application template comprises one or more object sub-templates that can be user configured to define the one or more required application variables.

15. The non-transitory, computer-readable medium of claim 12, wherein the one or more object templates organize application variables related to a respective groups of objects, wherein the groups of objects comprise objects related to a graphical user interface (GUI) module or objects related to a data source module.

16. The non-transitory, computer-readable medium of claim 12, wherein the set of potential application variables are identified based on one or more of syntactical analysis, pattern comparison against known patterns for which variable relationships are established, or explicit or implicit designation of variables within the source code.

17. The non-transitory, computer-readable medium of claim 12, wherein the code, when executed, causes the computing system to perform operations comprising:
   determining one or more optional application variables from the set of potential application variables; and
   generating or configuring the application template to further comprise some or all of the optional application variables.

18. The non-transitory, computer-readable medium of claim 17, wherein the one or more optional application variables are determined from the set of potential application variables based on using one or both of a historical preference of an organization to allow customization of a respective variable or machine learning.

* * * * *